(12) United States Patent
Naveh et al.

(10) Patent No.: US 9,477,517 B2
(45) Date of Patent: Oct. 25, 2016

(54) SERVICE BROKER SYSTEMS, METHODS, AND APPARATUS

(75) Inventors: Gadi Naveh, Sunnyvale, CA (US); Rishi Avtar, Fremont, CA (US); Ritesh Udapudi, Sunnyvale, CA (US); Fermin Ordaz, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 799 days.

(21) Appl. No.: 13/284,057

(22) Filed: Oct. 28, 2011

(65) Prior Publication Data

US 2013/0111550 A1 May 2, 2013

(51) Int. Cl.
*H04L 9/32* (2006.01)
*G06F 9/46* (2006.01)

(52) U.S. Cl.
CPC ..................... *G06F 9/468* (2013.01)

(58) Field of Classification Search
CPC ....................................................... H04L 9/32
USPC ......... 713/168–174, 182–186; 709/225, 229; 726/27–30
See application file for complete search history.

(56) References Cited

U.S. PATENT DOCUMENTS

| | | | |
|---|---|---|---|
| 6,473,855 B1 | 10/2002 | Welder | |
| 7,249,375 B2* | 7/2007 | Bhatia et al. | 726/8 |
| 7,483,984 B1* | 1/2009 | Jonker et al. | 709/226 |
| 2002/0147000 A1* | 10/2002 | Holmes-Kinsella | 455/405 |
| 2003/0101343 A1* | 5/2003 | Eaton et al. | 713/170 |
| 2006/0170965 A1* | 8/2006 | Ohara | 358/1.15 |
| 2009/0183151 A1* | 7/2009 | Gharabally et al. | 717/178 |
| 2010/0010944 A1 | 1/2010 | Cheng et al. | |
| 2010/0076933 A1 | 3/2010 | Hamilton et al. | |
| 2010/0077017 A1 | 3/2010 | Martinez et al. | |
| 2011/0093941 A1 | 4/2011 | Liu et al. | |
| 2012/0185925 A1* | 7/2012 | Barkie et al. | 726/7 |

* cited by examiner

*Primary Examiner* — Josnel Jeudy
(74) *Attorney, Agent, or Firm* — Norton Rose Fulbright US LLP

(57) ABSTRACT

In one implementation, a service broker system includes an authentication module to authenticate a plurality of devices with an account from a plurality of accounts of the service broker system based on a unique identifier of each device from the plurality of devices. Each device from the plurality of devices is associated with the account. The service broker system also includes a service access module to access data at a plurality of services using credentials stored at the account, and a delivery module to provide the data to each device from the plurality of devices.

19 Claims, 8 Drawing Sheets

SERVICE BROKER SYSTEMS, METHODS, AND APPARATUS

BACKGROUND

Users of multiple devices such as notebook computers, smartphones, tablets, and other mobile devices often access services via each of these devices. For example, a user can access electronic mail messages at a mail service using a notebook computer at one time, a smartphone at another time, and a tablet at yet another time. Typically, the user configures each device with a credential such as a username/password pair or digital certificate to access the mail service and retrieve electronic mail messages. Thus, each device accesses the mail service to retrieve electronic mail message.

DETAILED DESCRIPTION

Implementations discussed herein provide a service broker system via which multiple devices can access data from a group of services associated with an account of the service broker system without accessing those services. Said differently, implementations discussed herein include service broker systems supporting multi-device accounts. For example, a smartphone and a tablet device that belong to a single user can be associated with an account of the user at the service broker system. Credentials for accessing the services can be stored at the service broker system and used by the service broker system to access those services. The service broker system can then provide data accessed at those services to the multiple devices. Accordingly, each device need not, for example, access the services or store credentials related to the services. Furthermore, the service broker system can provide the data consistently to each of the devices to enhance synchronization of data among the devices.

Figure 1:
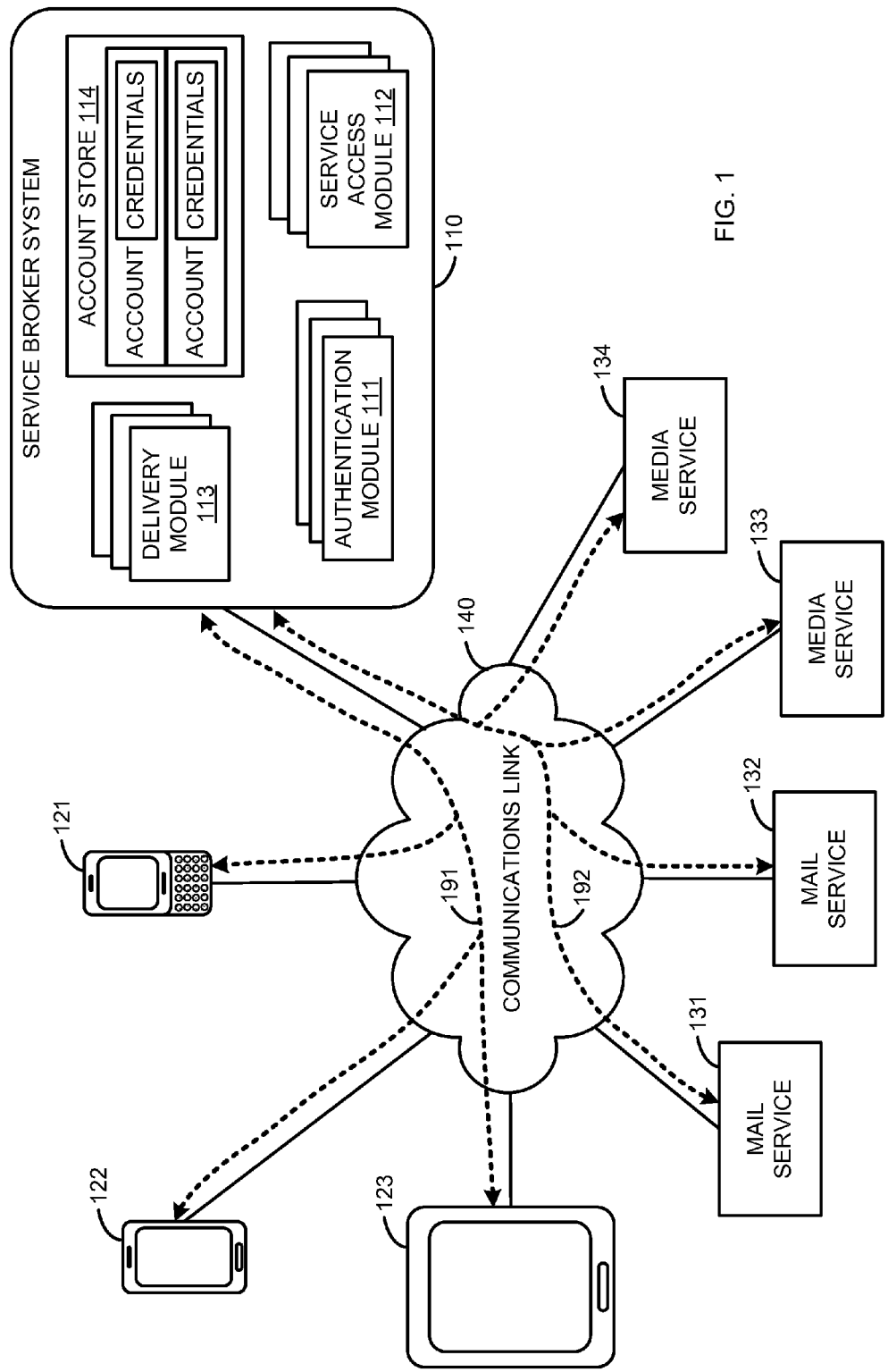
FIG. 1 is an illustration of an environment including a service broker system, according to an implementation.

FIG. 1 is an illustration of an environment including a service broker system, according to an implementation. The environment illustrated in FIG. 1 includes service broker system 110, devices 121, 122 and 123, mail services 131 and 132, media service 133 and 134, and communications link 140. Communications link 140 includes devices, services, or a combination thereof that define communications paths between service broker system 110, devices 121, 122 and 123, mail services 131 and 132, media services 133 and 134, and/or other services or resources (not shown). In other words, service broker system 110, devices 121, 122 and 123, mail services 131 and 132, media services 133 and 134, and/or other services or resources can communicate (e.g., exchange signals or symbols representing data) via communications link 140.

For example, communications link 140 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Communications link 140 can include communications networks such as an intranet, the Internet, other telecommunications networks, or a combination thereof. Additionally, communications link 140 can include proxies, routers, switches, gateways, bridges, load balancers, and similar communications devices. Furthermore, the connections and communications paths illustrated in FIG. 1 are logical and do not necessarily reflect physical connections.

As illustrated in FIG. 1, devices 121, 122, and 123 represent mobile computing devices. More specifically, device 121 represents a mobile computing device such as a smartphone with a movable or slidable keypad, device 122 represents a mobile computing device such as a smartphone or media player with a touch-sensitive display, and device 123 represents a mobile computing device such as a tablet or slate device with a touch-sensitive display. In other implementations, devices can be, for example, computing devices such as laptop or desktop computers, gaming consoles, portable gaming consoles, or other devices that can communicate with service broker system 110 via communications link 140.

Mail services 131 and 132 and media services 133 and 134 provide services via communications link 140. Services receive data, store data, manipulate or process data, provide access to data, and/or transport data. For example, mail services 131 and 132 receive, store, and provide access to data representing electronic mail messages. As another example, media services 133 and 134 store and/or provide access to data representing media resources. More specifically, for example, media services 133 and 134 can store data representing video that can be streamed to clients of media services 133 and 134. In other implementations, a media service can receive, store, and provide access to data representing images. Moreover, many other types of services (or service types) can be included in various implementations. For example, other services of other service types include: document storage services, image processing services, data processing services, purchasing or payment services, information services (e.g., weather services, traffic services, concierge services), and location services. Services are hosted (e.g., stored at a memory and executed at a processor) at physical or virtual computing devices such as computer servers and virtual machines, respectively.

Service broker system 110 accesses services (e.g., reads or writes data at services) such as mail services 131 and 132 and media services 133 and 134 via communications paths 192, and communicates related data with devices 121, 122, and 123 via communications paths 191. In other words, service broker system 110 access services on behalf of devices 121, 122, and 123. Such an architecture can be beneficial, for example, to maintain synchronization of data among devices 121, 122, and 123. As an example, in architectures in which each of devices 121, 122, and 123 access services independent of one another, data accessed at (e.g., read from or written to) those services are later reconciled with respect to each of devices 121, 122, and 123 to maintain consistency of data at (or to synchronize) each of devices 121, 122, and 123. Such reconciliation can be complex and generate significant amounts of communication traffic between devices 121, 122 and 123 and/or other devices or services.

In contrast, in the architecture illustrated in FIG. 1, service broker system 110 accesses data at services and provides that data set to devices 121, 122, and 123 to maintain a consistent data set for devices 121, 122, and 123. In other words, the architecture illustrated in FIG. 1 can enhance synchronization across devices 121, 122, and 123 because service broker system 110 can define an authoritative data set for devices 121, 122, and 123. For example, service broker system 110 can access data at those services, temporarily store those data, and provide that data to each of those devices rather than allow those devices to individually access the data at those services. Moreover, as discussed in more detail below, service broker system 110 can simplify synchronization of a new device.

Service broker system 110 includes authentication module 111, service access module 112, delivery module 113, and account store 114. Although various modules (i.e., combinations of hardware and software) are illustrated and discussed in relation to FIG. 1 and other example implementations, other combinations or sub-combinations of modules can be included within other implementations. Said differently, although the modules illustrated in FIG. 1 and discussed in other example implementations perform specific functionalities in the examples discussed herein, these and other functionalities can be accomplished at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Authentication module 111 communicates with devices 121, 122, and 123 to authenticate devices 121, 122, and 123 with service broker system 110. For example, authentication module 111 can receive tokens (e.g., encoded data sets) and/or unique identifiers (e.g., an identifier that uniquely identifies one device from other devices) from devices 121, 122, and 123 and compare such tokens or unique identifiers (or unique device identifiers) to information related to devices associated with accounts of service broker system 110 (e.g., stored at account store 113) to determine whether devices 121, 122, and 123 are associated with an account of service broker system 110.

Services access module 112 accesses services such as mail services 131 and 132 and media services 133 and 134 on behalf of accounts of service broker system 110. Said differently, services access module 112 accesses services on behalf of other devices associated with accounts of service broker system 110. For example, service access module 112 can access electronic mail messages at mail services 131 and 132 using credentials within an account in account store 114, and can provide those messages to devices associated with that account.

As a specific example, a user can provide access information (e.g., Internet Protocol (IP) addresses, Uniform Resource Locators (URLs), host names, or other identifying information) and credentials (e.g., usernames and passwords) for mail services 131 and 132 and media services 133 and 134 to service broker system 110 via a web-based interface, an application, or some other interface, and service broker system 110 stores the access information and credentials at an account for that user. Services access module 112 can then use the access information and credentials to access data for that user (or for the account of that user at service broker system 110) at mail services 131 and 132 and media services 133 and 134. That is, service access module 112 can, for example, log in to accounts of that user at mail services 131 and 132 and media services 133 and 134 to access data from or at those accounts. More specifically, for example, the user can have an image repository account at media service 133 and another image repository account at media service 134. Services access module 112 can access images (e.g., digital pictures and/or photographs) at both image repository accounts on behalf of the user (or on behalf of the account of that user at service broker system 110). As discussed in more detail below, delivery module 113 can then provide those images to multiple devices of the user that have been associated and authenticated with the user's account at service broker system 110.

In some implementations, service access module 112 stores and/or processes data accessed at services based on configuration parameters, preferences, or other settings of accounts of service broker system 110. For example, service access module 112 can order or reorder data based on one or more metrics (e.g., order electronic mail messages by date), can deduplicate data (e.g., discard duplicate images accessed at media services 133 and 134), and/or format data.

Service access module 112 can periodically or regularly access one or more services according to configuration parameters, preferences, or settings of accounts of service broker system 110. Moreover, service access module 112 can access one or more services in response to signals or communication received from those services or other services. For example, a service access module 112 can register to receive data (or signals indicating that new data is available) from a service when that service receives new data. Furthermore, service access module 112 can access one or more services in response to service requests from, for example, devices such as devices 121, 122, and 123 associated with accounts of service broker system 110.

Service access module 112 is in communication with delivery module 113, and provides data accessed at services to delivery module 113. Delivery module 113 provides those data to devices associated with the account on behalf of which service access module 112 accessed those data. In some implementations, account store 114 includes filters (or rules) related to devices associated with accounts of service broker system 110. Delivery module 113 can apply filters for the account to the data before providing the data to the devices associated with the account. For example, a filter can include image or video size limitations on data provided to a particular device (e.g., images or videos that do not comply with the size limitations are not provided to the device to which the filter applies or are modified to comply with the size limitations before the images or videos are provided to the device). Thus, data accessed at service access module 112 can be modified on a per-device basis and/or per-account basis before those data are provided to devices.

In some implementations, delivery module 113 pushes the data to the devices. For example, delivery module 113 can maintain persistent communications paths (or connections) with devices 121, 122, and 123, and can provide the data to devices 121, 122, and 123 via those communications paths. As a specific example, delivery module 113 and devices 121, 122, and 123 can support a messaging protocol such as the Extensible Messaging and Presence Protocol (XMPP), and delivery module 113 can provide the data to devices 121, 122, and 123 via that messaging protocol. In other implementations, each of devices 121, 122, and 123 can pull the data from delivery module 113. Said differently, devices 121, 122, and 123 can poll delivery module 113 to determine whether delivery module 113 has or has access to data that has not yet been provided to each of devices 121, 122, and 123. If delivery module 113 has or has access to such data, each of devices 121, 122, and 123 can request that data from delivery module 113.

Moreover, in some implementations, delivery module 113 maintains a record or log of data accessed by service access module 112 for an account that has not been successfully provided to each device associated with that account. Delivery module 113 can make repeated or future attempts to provide data to each device associated with that account. Thus, data can be consistently provided to each device associated with an account.

In some implementations, service broker system 110 can also include a request module (not shown) in communication with service access module 112 and/or delivery module 113. The request module can receive service requests from devices authenticated at authentication module 111 (i.e., devices associated with accounts of service broker system 110), and communicate with service access module 112 to cause service access module 112 to access data at one or more services based on the service request. In some implementations, a service request includes data generated at one device associated with an account that should be provided to other devices associated with that account. For example, a user of one device can update contact data for an individual at that device. That device can generate and provide to service broker system 110 a service request to cause service access module 112 to access (here, update or modify) data for that individual at a related service. In some implementations, the request module can provide the contact data to delivery module 113, and delivery module 113 can provide the contact data to other devices associated with the account to maintain consistency of data among the devices. In other implementations, service access module 112 can provide the contact data to delivery module 113, and delivery module 113 can provide the contact data to other devices associated with the account.

As illustrated in FIG. 1, authentication module 111, service access module 112, delivery module 113, and/or other modules of service broker system 110 can include multiple modules. Such an architecture can be useful to distribute, for example, a processing load associated with each module across multiple modules. In some implementations, each of the multiple modules can perform a particular task or function. For example, services access module 112 can include multiple modules, and each module can access services of a particular service type. Thus, as a more specific example, one module can access mail services based on the Post Office Protocol (POP), another module can access mail services based on the Simple Mail Transport Protocol (SMTP), another module can access mail services based on the Internet Message Access Protocol (IMAP), and another module can access a document storage service based on a proprietary protocol of that service.

Account store 114 is a database, other data store, or combination thereof that stores data or information related to accounts of service broker system 110. For example, account store 114 can store credentials associated with an account for accessing services. Additionally, account store 114 can store configuration parameters, preferences, and settings related to an account. For example, a frequency with which service access module 112 should access services, types of data that should or should not be provided to devices associated with an account, identifiers of devices associated with an account, tokens associated with an account, filters or restrictions on data provided to devices associated with an account, names or other identifiers of services to be accessed by service access module 112 on behalf of an account, and other information can be stored at accounts within account store 114. Such credentials, configuration parameters, preferences, settings, and other information can be provided to accounts in account store 114 via, for example, a Web- or Internet-based interface or other interface of service broker system 110.

Additionally, an account at account store 114 can include information related to devices associated with that account. For example, a device can provide configuration parameters, preferences, settings, properties, and other information to service broker system 110 during an association process. Furthermore, information related to data (e.g., content and applications) stored at a devices associated with an account can be store at that account within account store 114. More specifically, identifiers of video files, image files, document files, contact data, applications (e.g., software programs), and other data stored at a device can be stored within an account.

Such information can be provided to service broker system 110 by the device associated with the account. In other implementations, delivery module 113, for example, manages (e.g., changes or updates) this information as data are provided to the device. In some implementations, such information can be maintained at the account based on information provided to service broker system 110 by the device and management provided by delivery module 113 in response to data provided to the device. As a specific example, delivery module 113 can update this information when data are provided to the device, and the device can provide information related to, for example, deletion or movement of data at the device. In some implementations, service broker system 110 can derive or extract information related to data modifications (e.g., deletion or movement of data) at a device based on service requests provided to the service broker system 110 from the device. For example, the device can provide a service request to service broker system 110 to update a service in response to modification of data at the device. The service broker system 110 can determine from the service request what modifications were made to the data at the device and update related information at the account with which the device is associated.

Figure 2:
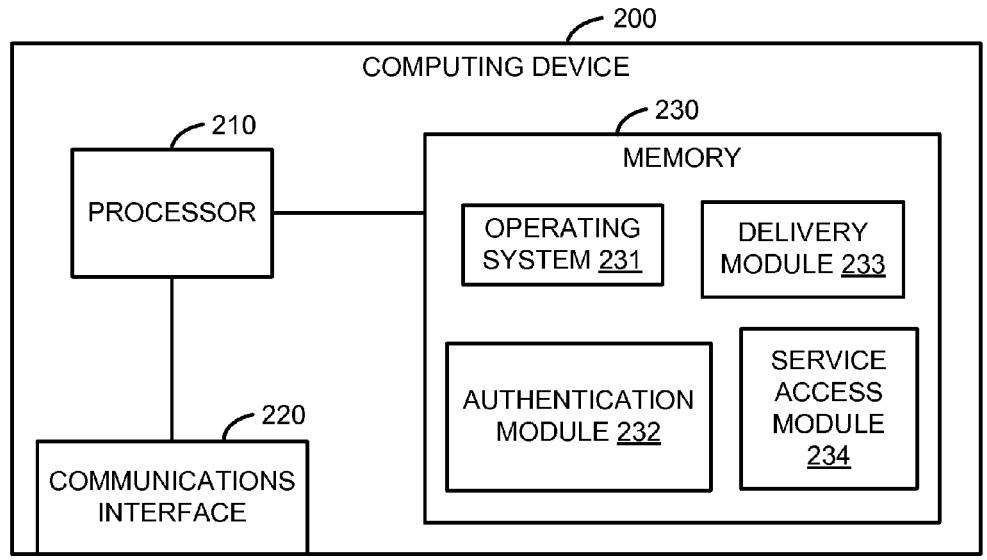
FIG. 2 is a schematic block diagram of a computing device hosting a service broker system, according to an implementation.

FIG. 2 is a schematic block diagram of a computing device hosting a service broker system, according to an implementation. Computing device 200 includes processor 210, communications interface 220, and memory 230. Processor 210 is any combination of hardware and software that executes or interprets instructions, codes, or signals. For example, processor 210 can be a microprocessor, an application-specific integrated circuit (ASIC), a distributed processor such as a cluster or network of processors or computing devices, a multi-core or multi-processor processor, or a virtual machine.

Communications interface 220 is a module via which processor 210 can communicate with other processors or computing devices via communications link. For example, communications interface 220 can include a network interface card and a protocol stack hosted at processor 210 (e.g., instructions or code stored at memory 230 and executed or interpreted at processor 210 to implement a network protocol). As specific examples, communications interface 220 can be a wired interface, a wireless interface, an Ethernet interface, a Fiber Channel interface, an InfiniBand interface, and IEEE 802.11 interface, or some other communications interface via which processor 210 can exchange signals or symbols representing data to communicate with other processors or computing devices.

Memory 230 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 230 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. In some implementations, memory 230 can be integrated with processor 210, separate from processor 210, or external to computing device 200.

Memory 230 includes instructions or codes that when executed at processor 210 implement operating system 231, authentication module 232, delivery module 233, and service access module 234. Authentication module 232, delivery module 233, and service access module 234 collectively implement a service broker system. In other words, operating system 231, authentication module 232, delivery module 233, and service access module 234 are each instructions or code that—when executed at processor 210—cause processor 210 to perform operations that implement a service broker system. Said differently, operating system 231, authentication module 232, delivery module 233, and service access module 234 are hosted at computing device 200 (or at processor 210). In some implementations, an account store and/or request module of a service broker system are also hosted at computing device 200.

In some implementations, computing device 200 can be a virtualized computing device. For example, computing device 200 can be hosted as a virtual machine at a computing server. Moreover, in some implementations, computing device 200 can be a virtualized computing appliance, and operating system 231 is a minimal or just-enough operating system to support (e.g., provide services such as a communications stack and access to components of computing device 200 such as communications interface 220) a service broker system including authentication module 232, delivery module 233, and service access module 234.

A service broker system (e.g., a service broker system including authentication module 232, delivery module 233, and service access module 234) can be accessed or installed at computing device 200 from a variety of memories or processor-readable media. For example, computing device 200 can access a remote processor-readable medium via a communications interface module (not shown) and the service broker system at that processor-readable medium. As a specific example, computing device 200 can be a thin client that accesses operating system 231 and the service broker system during a boot sequence.

As another example, computing device 200 can include (not illustrated in FIG. 2) a processor-readable medium access device (e.g., CD, DVD, SD, MMC, or a CF drive or reader) and the service broker system at a processor-readable medium via that processor-readable medium access device. As a more specific example, the processor-readable medium access device can be a DVD drive at which a DVD including an installation package for the service broker system is accessible. The installation package can be executed or interpreted at processor 210 to install the service broker system at computing device 200 (e.g., at memory 230). Computing device 200 can then host or execute the service broker system.

In some implementations, a service broker system can be accessed at or installed from multiple sources, locations, or resources. For example, some components or modules of the service broker system can be installed via a communications link, and other components or modules of the service broker system can be installed from a DVD.

Figure 3:
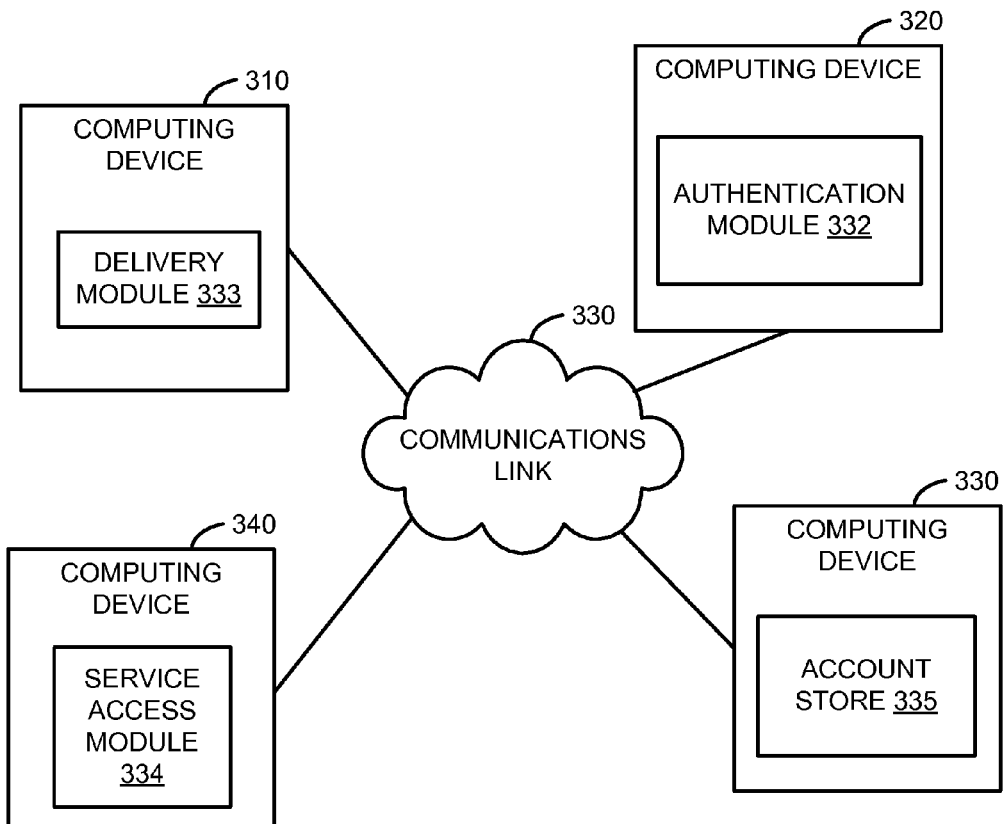
FIG. 3 is a schematic block diagram of a group of computing devices hosting a service broker system, according to an implementation.

FIG. 3 is a schematic block diagram of a group of computing devices hosting a service broker system, according to an implementation. As illustrated in FIG. 3, various components or modules of a service broker system can be hosted at different computing devices in communication one with another via a communications link. In other words, a service broker system can be distributed across a group of computing device. Such computing device can be physical computing devices such as computer servers, logical or virtual computing devices such as virtual machines, or a combination thereof. Such implementations can be referred to as cloud, cloud-based, or cloud-hosted implementations, and can be hosted within, for example, one or more data centers, physical computing devices, virtual computing devices, or a combination thereof.

As illustrated in FIG. 3, computing device 310 hosts delivery module 333, computing device 320 authentication module 332, computing device 330 hosts account store 335, and computing device 340 hosts service access module 334. Authentication module 332, delivery module 333, service access module 334, and account store 335 are each a component of a service broker system. The service broker system can include other components such as request module (not shown) hosted at one of computing devices 310, 320, 330, or 340, or at a different computing device (not shown).

Moreover, components of the service broker system can be distributed across multiple computing devices. For example, service access module 334 can be hosted at computing device 340 and at another computing device. Such implementations can provide enhanced fault tolerance and failover capabilities for a service broker system.

Figure 4:
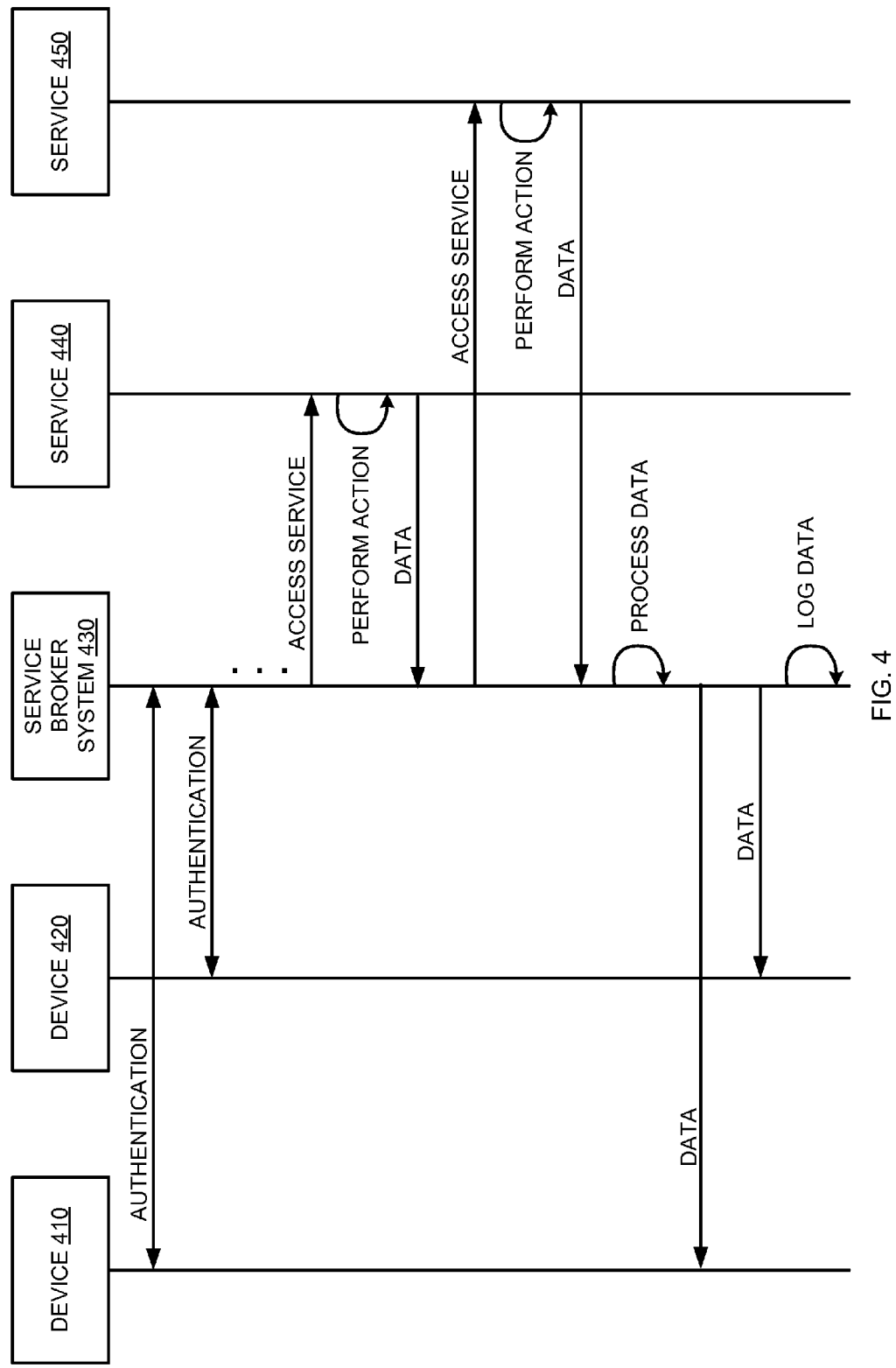
FIG. 4 is an illustration of a data flow within an environment including a service broker system, according to an implementation.

FIG. 4 is an illustration of a data flow within an environment including a service broker system, according to an implementation. The environment illustrated in FIG. 4 includes device 410, device 420, service broker system 430, service 440, and service 450. Devices 410 and 420 are associated with a common (or single) account of service broker system 430. As illustrated in FIG. 4, device 410 and device 420 authenticate with service broker system 430. For example, device 410 and device 420 can each provide a unique identifier, a token, or other information to service broker system 430 to authenticate with an account of service broker system 430 with which devices 410 and 420 are associated. In some implementations, communications paths are opened or initialized between devices 410 and 420 and service broker system 430 as part of the authentication.

After devices 410 and 420 have been authenticated with service broker system 430, service broker system 430 pushes data accessed at services 440 and 450 to devices 410 and 420. More specifically, for example, at predetermined intervals (e.g., based on settings of the account with which devices 410 and 420 are associated) service broker system 430 can access service 440 and service 450. That is, service broker system 430 can request data (e.g., retrieval of electronic mail messages or new versions of a document) at services 440 and 450 at predetermined intervals. Services 440 and 450 each perform an action in response to the accesses, and provide related or result data to service broker system 430.

After receiving the data, service broker system 430 can process or manipulate those data based on a variety of conditions and/or settings. For example, service broker system 430 can manipulate those data based on configuration parameters, preferences, settings, filters, or other information at the account with which devices 410 and 420 are associated. As additional examples, service broker system 430 can manipulate those data base on the service types of services 440 and 450, metadata related to those data, and/or data values included in those data. In some implementations, or for some data, those data are not manipulated.

Service broker system 430 then provides the data to devices 410 and 420. In some implementations, the same data are provided to device 410 and to device 420. In some implementations, the data provided to devices 410 differs from the data provided to device 420. For example, based on properties such as memory, processing capacity, display size, or other filters, configuration parameters, preferences, settings, or properties of devices 410 and 420 stored at the account, service broker system 430 can provide some data to device 410 and different data to device 420. For example, service broker system 430 can modify or manipulate data representing content (e.g., images, video, contact information, and documents), applications, or other information for device 410 or device 420, and provide the modified data to device 410 or device 420.

Service broker system 430 then logs (or makes record of) the data provided to devices 410 and 420. For example, service broker system 430 can maintain a record (or log) of data provided to each of devices 410 and 420. If, for example, service broker system 430 was unable to provide the data to device 410 (e.g., due to a failure or delay in a communications link), service broker system 430 can periodically or in response to a signal inspect the record to determine that the data was not provided to device 410 and make another attempt to provide the data to device 410. Additionally, such a record allows service broker system 430 to determine what data is available at devices 410 and 420. In some implementations, devices 410 and 420 cooperate in the maintenance of such records by notifying service broker system 430 when data is moved or deleted at devices 410 and 420.

Figure 5:
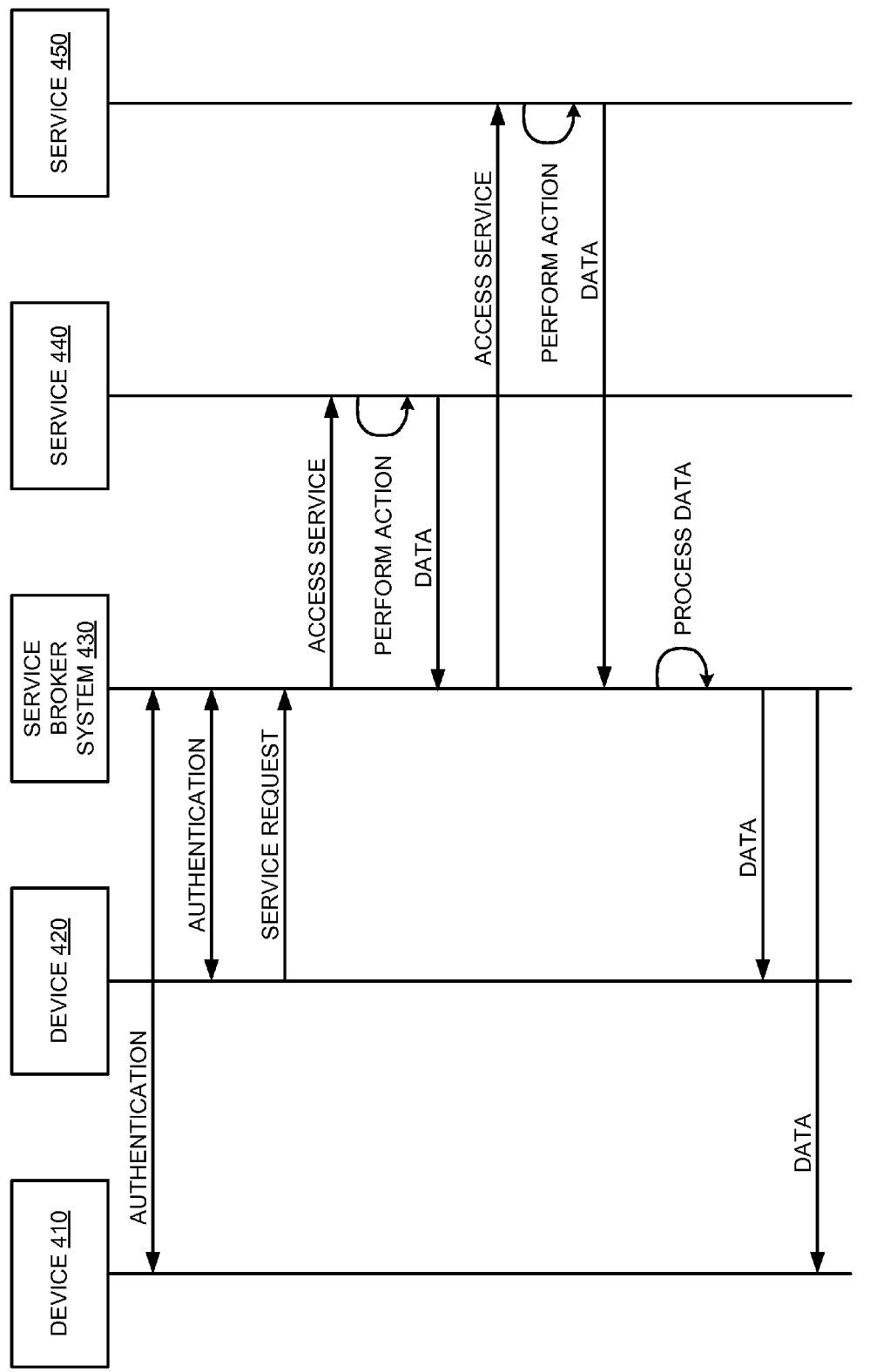
FIG. 5 is an illustration of another data flow within an environment including a service broker system, according to another implementation.

FIG. 5 is an illustration of another data flow within an environment including a service broker system, according to another implementation. The environment illustrated in FIG. 5 is similar to the environment illustrated in FIG. 4 and includes device 410, device 420, service broker system 430, service 440, and service 450. Devices 410 and 420 are associated with a common (or single) account of service broker system 430. As illustrated in FIG. 5, device 410 and device 420 authenticate with service broker system 430. For example, device 410 and device 420 can each provide a unique identifier, a token, or other information to service broker system 430 to authenticate with an account of service broker system 430 with which devices 410 and 420 are associated. In some implementations, communications paths are opened or initialized between devices 410 and 420 and service broker system 430 as part of the authentication.

After devices 410 and 420 have been authenticated with service broker system 430, service broker system 430 provides data accessed at services 440 and 450 to devices 410 and 420. More specifically, for example, service broker system 430 receives a service request from device 420, and accesses service 440 and service 450 in response to the service request. A service request is a request for access to data at a service. The access can be a read access at a service, a write access at a service, a delete access at a service, a modify access at a service, a purchase access at a service, or some other access at a service. As a specific example, a service request can be a read access to retrieve a document stored at a document storage service. As another example, a service request can be write access to store a document at a document storage service, and can include data representing the document. As yet another example, a service request can be a modify access to a document storage service, and can include data representing modifications to a document stored at the document storage service.

Furthermore, a service request can be generic. For example, a service request can relate to a service type rather than to a particular service. Thus, service broker system 430 can access multiple services of a service type in response to a service request related to that service type. As a more specific example, a service type can identify media such as images that are more recent than a particular date and not specify a service at which the media should be accessed. Service broker system 430 can access such images from multiple services for which credentials or other access information is included at the account with which the device providing the service request is associated in response to the service request. Such images can be cached or temporarily stored at service broker system 430 due to periodic accesses to those services or can be accessed at those services in response to the service request. Service broker system 430 can then provide the images to the device and other devices associated with the account. Thus, the service request can specify a type of service, and service broker system 430 can respond with data from appropriate services even though those services are not specified in the service request.

Service broker system 430 receives the service request and accesses services 440 and 450 to fulfill or respond to the service request. Although FIG. 5 illustrates service broker system 430 accessing both of services 440 and 450 in response to the service request, in some implementations, service broker system 430 accesses only one service or additional services in response to the service request. Services 440 and 450 each perform an action in response to the accesses, and provide related or result data to service broker system 430.

After receiving the data, service broker system 430 can process or manipulate those data based on a variety of conditions and/or settings. Alternatively, in some implementations, or for some data, those data are not manipulated.

Service broker system 430 then provides the data to device 410. As illustrated in FIG. 5, in some implementations, the data is also provided to device 420. The data provided to device 410 can differ from the data provided to device 420. For example, service broker system 430 can provide data included in the service request (e.g., data representing a modification to a document) and result data from services 440 and 450 (e.g., a version of a document after data representing a modification have been applied to the document and status information such as success or failure) to device 410. However, service broker system 430 can provide the result data from services 440 and 450 and not the data included in the service request (e.g., because that data already exists at device 420) to device 420. Moreover, in some implementations, service broker system 430 provides the data included in the service request are provided to device 410 before or concurrent with the accesses to services 440 and 450, and the result data are provided as illustrated in FIG. 5. Furthermore, although not illustrated in FIG. 5, in some implementations, service broker system 430 can update a record of data provided to devices 410 and 420.

Figure 6:
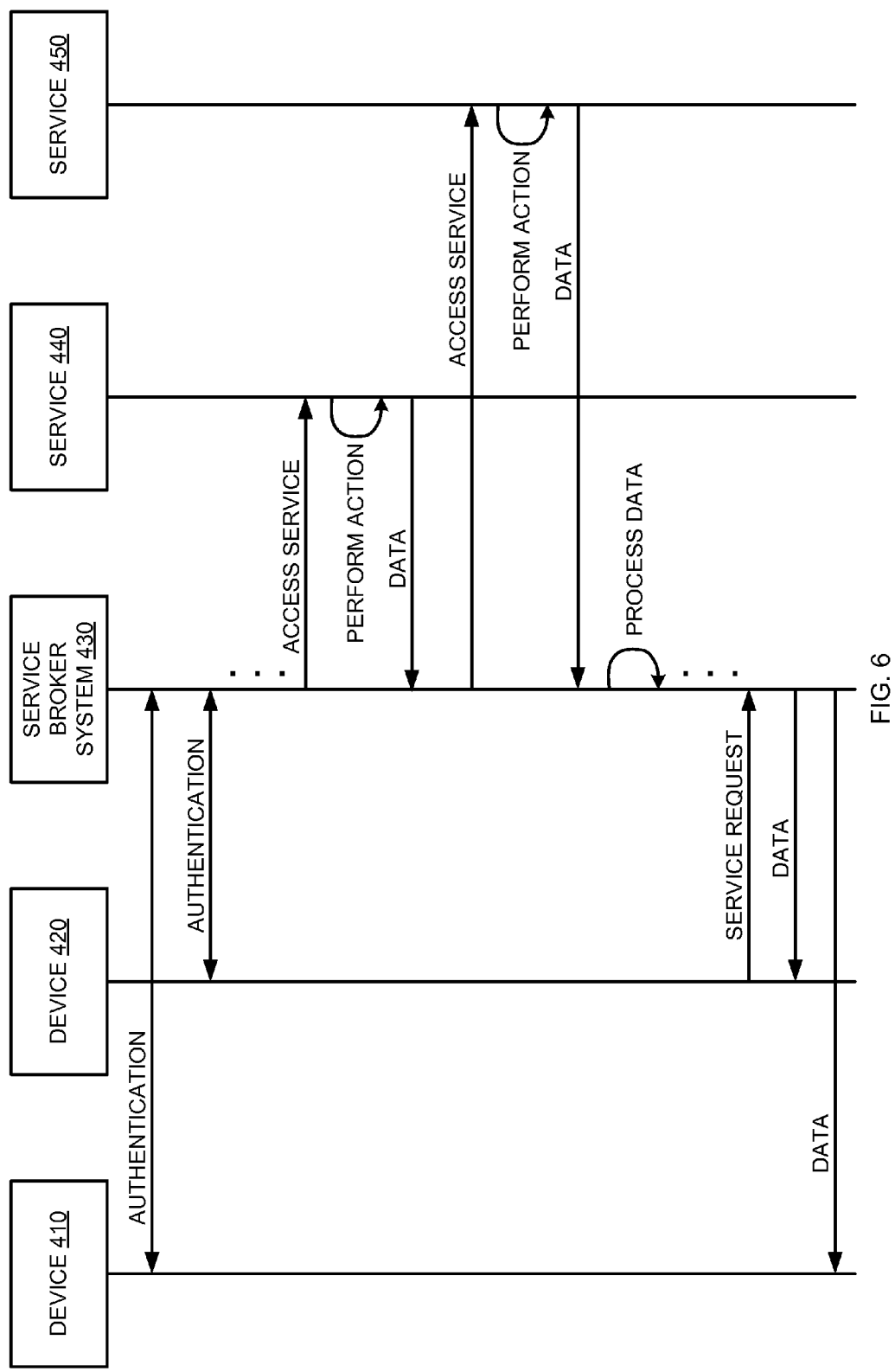
FIG. 6 is an illustration of another data flow within an environment including a service broker system, according to another implementation.

FIG. 6 is an illustration of another data flow within an environment including a service broker system, according to another implementation. The environment illustrated in FIG. 6 is similar to the environment illustrated in FIG. 4 and includes device 410, device 420, service broker system 430, service 440, and service 450. Devices 410 and 420 are associated with a common (or single) account of service broker system 430. As illustrated in FIG. 6, device 410 and device 420 authenticate with service broker system 430. For example, device 410 and device 420 can each provide a unique identifier, a token, or other information to service broker system 430 to authenticate with an account of service broker system 430 with which devices 410 and 420 are associated. In some implementations, communications paths are opened or initialized between devices 410 and 420 and service broker system 430 as part of the authentication.

After devices 410 and 420 have been authenticated with service broker system 430, service broker system 430 provides data accessed at services 440 and 450 to devices 410 and 420 in response to service requests from devices 410 and 420. More specifically, for example, at predetermined intervals (e.g., based on settings of the account with which devices 410 and 420 are associated) service broker system 430 can access service 440 and service 450. That is, service broker system 430 can request data (e.g., retrieval of electronic mail messages or new versions of a document) at services 440 and 450 at predetermined intervals. Services 440 and 450 each perform an action in response to the accesses, and provide related or result data to service broker system 430.

After receiving the data, service broker system 430 can process or manipulate those data based on a variety of conditions and/or settings. In some implementations, or for some data, those data are not manipulated.

Service broker system 430 then provides the data to devices 410 and 420 in response to service requests. For example, as illustrated in FIG. 6, device 420 provides a service request to service broker system 430, and service broker system 430 provides data accessed at services 440 and 450 to device 420. In other words, device 420 pulls the data from service broker system 430. In some implementations, service broker system 430 also provides (e.g., pushes) the data (or a modified version of the data) to device 410 in response to the service request from device 420, for example, to maintain consistency among the data at devices 420 and 410. In other implementations, service broker system 430 does not provide the data to device 410 in response to the service request from device 420. Rather, service broker system 430 provides the data to device 410 in response to a service request from device 410.

Figure 7:
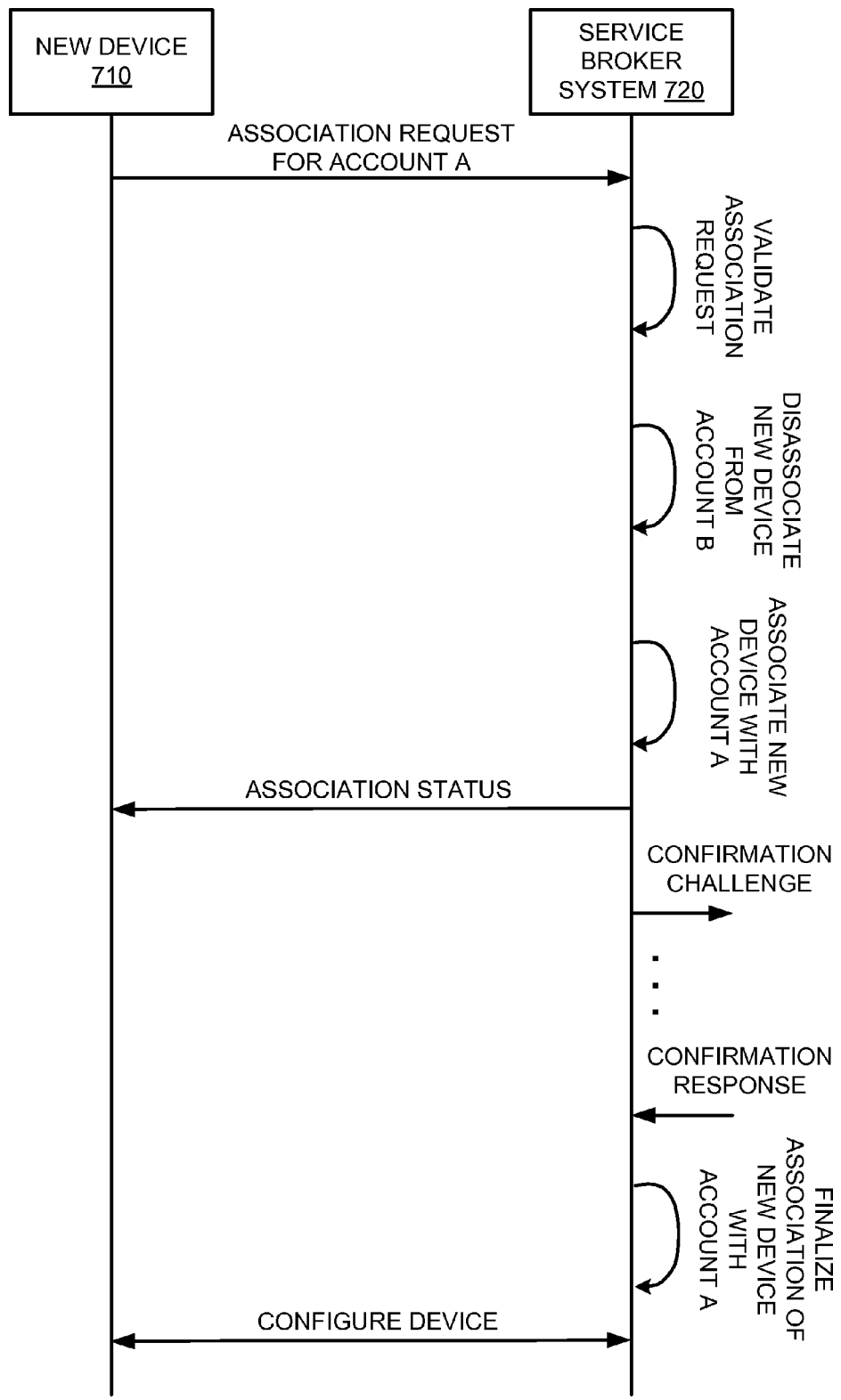
FIG. 7 is an illustration of another data flow within an environment including a service broker system, according to another implementation.

FIG. 7 is an illustration of another data flow within an environment including a service broker system, according to another implementation. The data flow illustrated in FIG. 7 is an example of association of a new device 710 with service broker system 720. New device 710 is a device that is not currently associated with account A. More generically, a new device with respect to an account (e.g., an account of a user or client of a service broker system) is a device that is not currently associated with that account.

As illustrated in FIG. 7, new device 710 sends an association request relative to (or for) account A to service broker system 720. In other words, new device 710 requests to be associated with account A of service broker system 720. For example, a user of new device 710 can input a credential such as a username and password related to account A (but not related to services accessed by service broker system 720 on behalf of account A), and new device 710 can send the association request including the credential and a unique identifier of new device 710 to service broker system 720.

After receiving the association request, service broker system 720 validates the association request to determine whether new device 710 can be associated with account A. For example, the credential provided in the association request can be validated against account A to determine whether that credential is valid for account A. If the credential is valid for account A, service broker system 720 can determine that new device 710 is authorized to be associated with account A.

Additionally, service broker system 720 can determine whether the unique identifier of new device 710 included in the association request is associated with another account. That is, service broker system 720 can determine whether new device 710 is associated with another account. If the unique identifier of new device 710 included in the association request is not associated with another account, new device 710 can be associated with account A. However, if the unique identifier of new device 710 included in the association request is associated with another account, new device 710 is disassociated with the other account before it can be associated with account A.

As illustrated in FIG. 7, new device 710 is associated with account B, and is disassociated with or from account B to prevent new device 710 from authenticating with account B. For example, the unique identifier of new device 710 can be removed from a list of associated devices for account B. As another example, a token or other credential used by new device 710 to authenticate with account B can be revoked at account B to prevent new device 710 from authenticating with account B.

New device is then associated with account A. For example, the unique identifier of new device 710 can be added from a list of associated devices for account A. As another example, service broker system 720 can generate a token or other credential for use by new device 710 to authenticate with account A, and can be provide the token or other credential to new device 710. Service broker system 720 then provides an association status to new device 710 to indicate whether new device 710 is associated with account A.

In some implementations, as illustrated in FIG. 7, the association with account A is provisional. That is, the association of new device 710 with account A must be confirmed or approved before it is finalized or committed. Service broker system 720 sends a confirmation challenge, for example, to an owner of account A to confirm the association of new device 710 with account A. The confirmation challenge requires the owner of account A to perform some action to provide the confirmation response before the association is finalized. As a specific example, service broker system 720 sends an electronic mail message including a Uniform Resource Locator (URL) with a token to an electronic mailbox designated within account A. The owner of account A can input the URL to a Web-browser which will generate the confirmation response by providing the token to service broker system 720 (directly or indirectly via another service). Service broker system 720 then finalizes or commits the association of new device 710 with account A to enable new device 710 to authenticate with account A.

In some implementations, if the confirmation response is not received at service broker system 720 within a predetermined amount of time, the association with account A and/or the disassociation with account B can be rolled back. In other words, new device 710 can revert to the previous association with account B if the confirmation response is not received at service broker system 720 within a predetermined amount of time.

After new device 710 is associated with account A, new device 710 can be configure based on information stored at account A. For example, a user can select one or more other devices associated with account A as a baseline configuration for new device 710 via a user interface such as a webpage or a user interface at new device 710. The baseline configuration for new device 710 can include the configuration parameters, preferences, settings, content, applications, and/or other information stored at the one or more other devices. Service broker system 720 can provide data related to those devices such as configuration parameters, preferences, settings, content, applications, contact information, and/or other information to new device 710.

Such data can be accessed at account A and/or at services accessible to service broker system 720. Said differently, service broker system 720 can synchronize new device 710 with another device or other devices in response to user input using data at account A and/or at various services. Alternatively, for example, service broker system 720 can synchronize new device 710 with another device or other devices based on rules, preferences, or settings of account A. For example, service broker system 720 can select the device or devices used to define the baseline configuration for new device 710 based on the type and/or other properties (e.g., memory, display size, an processing capacity) of new device 710 and the type and/or other properties of other devices associated with account A. More specifically, for example, new device 710 can be a tablet device and service broker system 720 can select other tablet devices with similar properties to define the baseline configuration. In other implementations, service broker system 720 can use or apply other rules, preferences, or settings of account A and/or properties to select the device or devices used to define the baseline configuration for new device 710.

Figure 8:
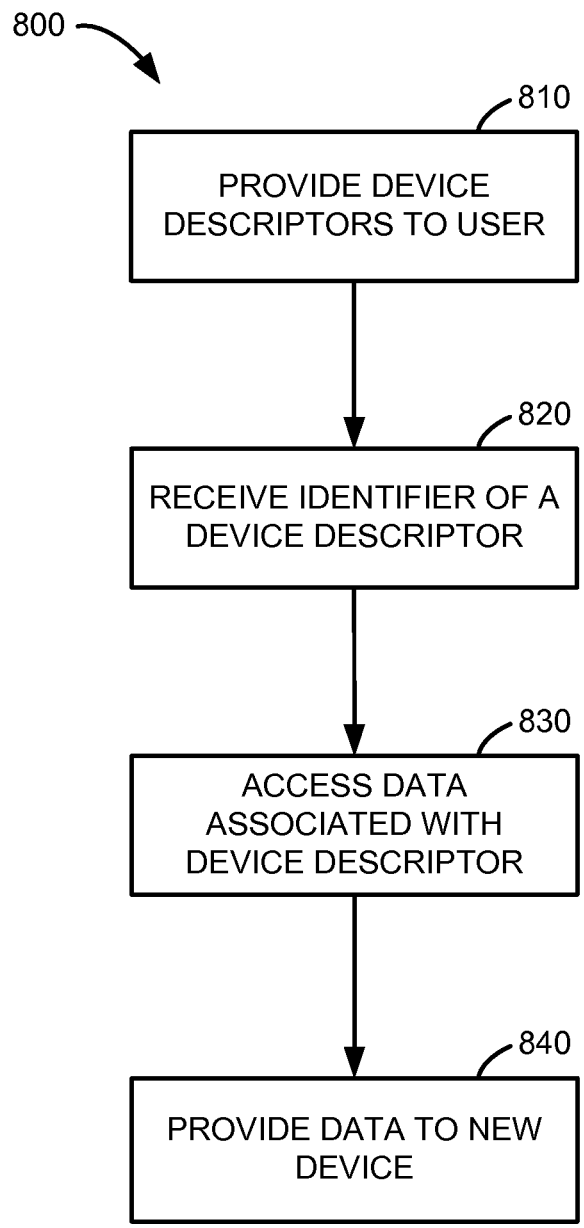
FIG. 8 is a flow chart of a process to provide data to a new device from a service broker system, according to an implementation.

As a specific example, FIG. 8 is a flow chart of a process to provide data to a new device from a service broker system, according to an implementation. A service broker system can implement process 800 to configure a new device (e.g., a device that is newly or recently associated with an account at the service broker service). A service broker system implementing process 800 provides device descriptors of devices associated with an account to a user at block 810. For example, the service broker system can provide the device descriptors to the user via an interface such as a user interface of the new device or of a webpage. A device descriptor is information that represents or describes a device. For example, the device descriptors provided at block 810 can include a name of each device, model information of each device, and/or a graphic, image or icon representing each device.

An identifier of a device descriptor is then received at block 820. That is, the service broker system implementing process 800 receives an identifier that indicates which device descriptor was selected by the user via the interface. The device represented by the device descriptor associated with the identifier will be used to define the baseline configuration of the new device. Data associated with that device descriptor (or with the device represented by that device descriptor) are then accessed at block 830. For example, the service broker system implementing process 800 can access records or logs, configuration parameters, preferences, settings, or other information stored at the account to determine which data (e.g., configuration parameters, preferences, settings, content, applications, contact information, and/or other information) are stored at the device (or devices) that define the baseline configuration of the new device.

Such data can be stored, for example, at an account with which the new device is associated available at an account store of the service broker system implementing process 800, at service accessible to the service broker system implementing process 800, and/or at a combination thereof. Accordingly, the service broker system implementing process 800 can access these data at the account and/or accesses one or more services to access these data. The data are then provided to the new device at block 840, and the new device can store such data and/or alter, for example, configuration parameters, preferences, and/or settings at the new device.

In some implementations, multiple devices can be used to define the baseline configuration of the new device. Accordingly, multiple identifiers can be received at block 820 and data associated with the devices represented by the device descriptors related to those identifiers are used to define the baseline configuration of the new device and are accessed at block 830. Thus, the new device can be configured based on multiple other devices associated with the account.

Figure 9:
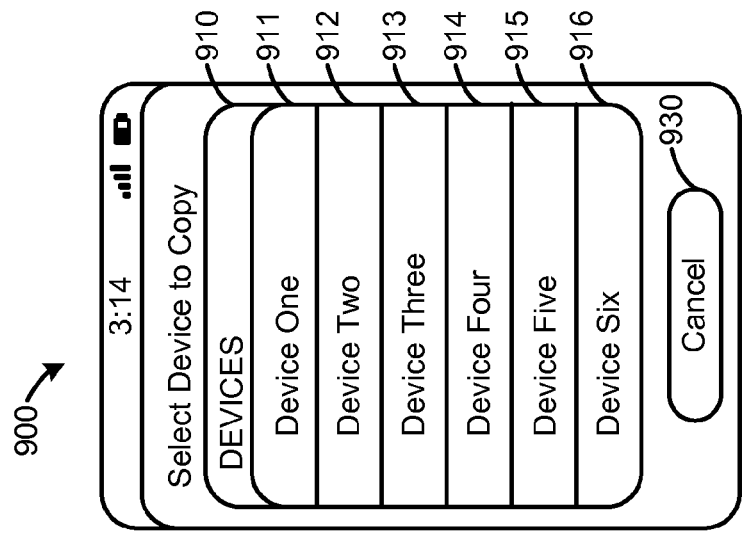
FIG. 9 is an illustration of an interface for selecting a device to configure a new device via a service broker system, according to an implementation.

FIG. 9 is an illustration of an interface for selecting a device to configure a new device via a service broker system, according to an implementation. Interface 900 can be implemented at, for example, a new device and includes list 910, list items 911-916, and control 930. Each of list items 911-916 includes information from a device descriptor. In the example illustrated in FIG. 9, each of list items 911-916 includes a textual description from a device descriptor of a device.

A user of interface 900 selects a device to be used to define a baseline configuration by selecting (e.g., by touching at a touch-sensitive display or using an input device such as a computer mouse) one of list items 911-916. Alternatively, the user can select control 930 to cancel the configuration of the new device. After the user selects the list item related to the device description representing the device to be used to define the baseline configuration, an identifier of that device description (or that device) is provided to a service broker system.

Figure 10:
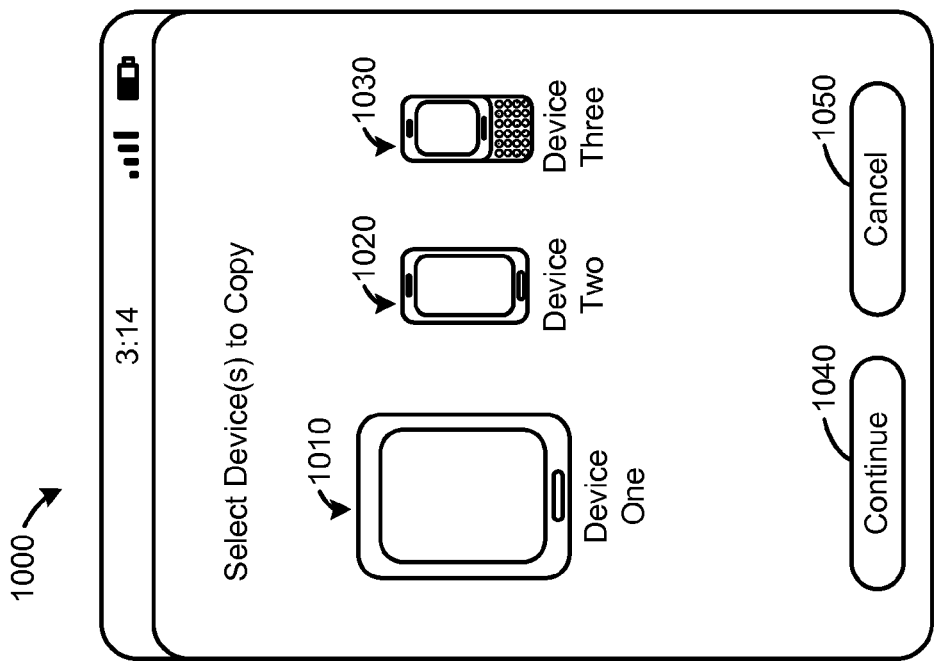
FIG. 10 is an illustration of an interface for selecting a device to configure a new device via a service broker system, according to another implementation.

FIG. 10 is an illustration of another interface for selecting a device to configure a new device via a service broker system, according to another implementation. User interface 1000 is similar to user interface 900, but devices descriptors 1010, 1020, and 1030 in interface 1000 include graphical representations of devices associated with an account. Additionally, the user can select multiple devices to be used to define the baseline configuration for the new device.

For example, a user can select device descriptor 1010, device descriptor 1030, and control 1040 to send identifiers of device descriptor 1010 and device descriptor 1030 to a service broker system to define the baseline configuration for the new device. Alternatively, the user can select control 1050 to cancel the configuration of the new device.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the term "based on" means "based at least in part on." Thus, a feature that is described as based on some cause, can be based only on the cause, or based on that cause and on one or more other causes. Furthermore, as used herein, the singular forms "a," "an," and "the" include plural referents unless the context clearly dictates otherwise. Thus, for example, the term "module" is intended to mean one or more modules or a combination of modules.

What is claimed is:

1. A service broker system, comprising:
    an authentication module to authenticate a plurality of devices with an account from a plurality of accounts of the service broker system based on a unique identifier of each device from the plurality of devices, each device from the plurality of devices associated with the account;
    a service access module to access data at a plurality of services using credentials stored at the account, wherein at least one of the plurality of devices does not have stored within a memory of the at least one of the plurality of devices a credential related to at least one of the plurality of services; and
    a delivery module to provide the data to each device from the plurality of devices.

2. The service broker system of claim 1, wherein:
    the service access module is a first service access module;
    the plurality of services is a first plurality of services of a first service type;
    the delivery module is a first delivery module; and
    the data is first data accessed at the first plurality of services;
    the service broker system further comprising:
    a second service access module to access second data at a second plurality of services using credentials stored at the account, the second plurality of services of a second service type different from the first service type; and
    a second delivery module to provide the second data to each device from the plurality of devices.

3. The service broker system of claim 1, further comprising a request module to receive a service request from a device from the plurality of devices, the service access module accesses the data at the plurality of services in response to the service request.

4. The service broker system of claim 1, further comprising a request module to receive a service request from a device from the plurality of devices, the delivery module provides the data to each device from the plurality of devices response to the service request.

5. The service broker system of claim 1, wherein the delivery modules provides the data to each device from the plurality of devices independent of a service request.

6. The service broker system of claim 1, further comprising an association module to associate each device from the plurality of devices with the account.

7. The service broker system of claim 1, wherein the delivery module provides the data to each device from the plurality of devices via a persistent messaging protocol.

8. A method, comprising:
    from a service broker system, comprising a server, providing a plurality of device descriptors to a user, each device descriptor from the plurality of device descriptors representing a device associated with an account at the service broker system, wherein at least one of a plurality of devices associated with the account does not have stored within a memory of the at least one of the plurality of devices a credential related to a service associated with the account;
    the service broker system receiving an identifier of a device descriptor selected by the user from the plurality of device descriptors;
    the service broker system accessing data associated with the device represented by the selected device descriptor at the account; and
    the service broker system providing the data to a new device to configure the new device to associate with the account at the service broker system.

9. The method of claim 8, wherein the identifier is a first identifier, the device descriptor is a first device descriptor and the data is first data, the method further comprising:
    receiving a second identifier of a second device descriptor from the plurality of device descriptors;
    accessing second data associated with the device represented by the second device descriptor at the account; and
    providing the second data to the new device.

10. The method of claim 8, wherein the providing the plurality of device descriptors to the user includes providing the plurality of device descriptors to the new device.

11. The method of claim 8, further comprising associating the new device with the account at the service broker system before the providing the plurality of device descriptors to the user.

12. The method of claim 8, further comprising:
    the service broker system receiving an association request relative to a first account of the service broker system from a first device including a unique identifier of the first device;
    the service broker system determining that the first device is associated with a second account of the service broker system;

the service broker system, in response to the association request relative to the first account, disassociating the first device from the second account; and the service broker system associating the first device with the first account.

13. The method of claim 12, wherein disassociating the first device from the second account includes revoking a token stored at the first device.

14. The method of claim 12, further comprising:

the service broker system receiving another identifier of another device descriptor selected by the user from the plurality of device descriptors;

the service broker system providing data from the account to the first device, the data including first data associated with the device represented by the selected device descriptor at the account and second data associated with another device represented by the another device descriptor.

15. The method of claim 12, further comprising:

the service broker system accessing data at a plurality of services using credentials stored at the account; and the service broker system providing the data to the plurality of devices associated with the account, the plurality of devices including the new device.

16. The method of claim 12, further comprising:

the service broker system accessing data at a plurality of services using credentials stored at the account; and the service broker system pushing the data to the plurality of devices associated with the account, the plurality of devices including the new device.

17. A service broker system, comprising:

an authentication module to authenticate any of a plurality of devices with an account from a plurality of accounts of the service broker system based on a unique identifier of each device from the plurality of devices, each device from the plurality of devices associated with the same account at the service broker system;

a service access module to access data at any of a plurality of services on behalf of at least one of the plurality of devices using credentials stored at the account, wherein the at least one of the plurality of devices does not have stored within a memory of the at least one of the plurality of devices a credential related to at least one of the plurality of services; and a delivery module to provide that data to at least one device from the plurality of devices associated with the account.

18. The service broker system of claim 17, wherein the service broker system maintains an authoritative data set for corresponding data on each of the plurality of devices so as to improve synchronization of the corresponding data sets on each of the plurality of devices.

19. The service broker system of claim 17, wherein the delivery module maintains a log of any data access by the service access module that has not been provided to each of the plurality of devices so as to make repeated attempts to deliver that data to any of the plurality of devices that has not yet received that data.

* * * * *